United States Patent
Grenie et al.

(10) Patent No.: US 9,784,864 B2
(45) Date of Patent: Oct. 10, 2017

(54) MIXED SEQUENTIAL AND SIMULTANEOUS SOURCE ACQUISITION AND SYSTEM

(71) Applicant: CGG SERVICES SA, Massy (FR)

(72) Inventors: Damien Grenie, Limours (FR); Thomas Mensch, Paris (FR); Risto Siliqi, Paris (FR)

(73) Assignee: CGG SERVICES SAS, Massy (FR)

( * ) Notice: Subject to any disclaimer, the term of this patent is extended or adjusted under 35 U.S.C. 154(b) by 839 days.

(21) Appl. No.: 14/026,588

(22) Filed: Sep. 13, 2013

(65) Prior Publication Data

US 2014/0081576 A1    Mar. 20, 2014

Related U.S. Application Data

(60) Provisional application No. 61/701,092, filed on Sep. 14, 2012.

(51) Int. Cl.
*G01V 1/30* (2006.01)
*G01V 1/38* (2006.01)

(52) U.S. Cl.
CPC .............. *G01V 1/30* (2013.01); *G01V 1/3808* (2013.01)

(58) Field of Classification Search
CPC ....... G01V 1/30; G01V 1/3808; G01V 1/3843
USPC .......................................................... 702/14
See application file for complete search history.

(56) References Cited

U.S. PATENT DOCUMENTS

| | | | | |
|---|---|---|---|---|
| 4,357,689 A | * | 11/1982 | Ruehle ................. | G01V 1/3808 367/23 |
| 2004/0013037 A1 | * | 1/2004 | Vaage .................. | G01V 1/3808 367/21 |
| 2010/0027374 A1 | * | 2/2010 | Moldoveanu ............ | G01V 1/38 367/16 |
| 2011/0310700 A1 | * | 12/2011 | Robertsson .......... | G01V 1/3808 367/21 |
| 2013/0250720 A1 | * | 9/2013 | Monk .................. | G01V 1/3861 367/20 |
| 2013/0265849 A1 | * | 10/2013 | Bunting ............... | G01V 1/3826 367/16 |
| 2014/0036060 A1 | * | 2/2014 | Claussen ................ | G01V 1/003 348/85 |

* cited by examiner

*Primary Examiner* — John Breene
*Assistant Examiner* — Eyob Hagos
(74) *Attorney, Agent, or Firm* — Patent Portfolio Builders PLLC

(57) ABSTRACT

Systems and methods for acquiring blended and unblended seismic data during a single seismic survey. The blended and unblended seismic data is generated with a plurality of sources that are fired in a dedicated sequence. The sequence involves firing all the sources at a first time, advancing the sources along a given path, firing only a first source at a second time, later than the first time, advancing the sources, firing again all the sources at a third time, later than the second time, advancing the sources, firing only a second source at a fourth time, later than the third time, and so on until a desired subsurface is fully surveyed.

17 Claims, 10 Drawing Sheets

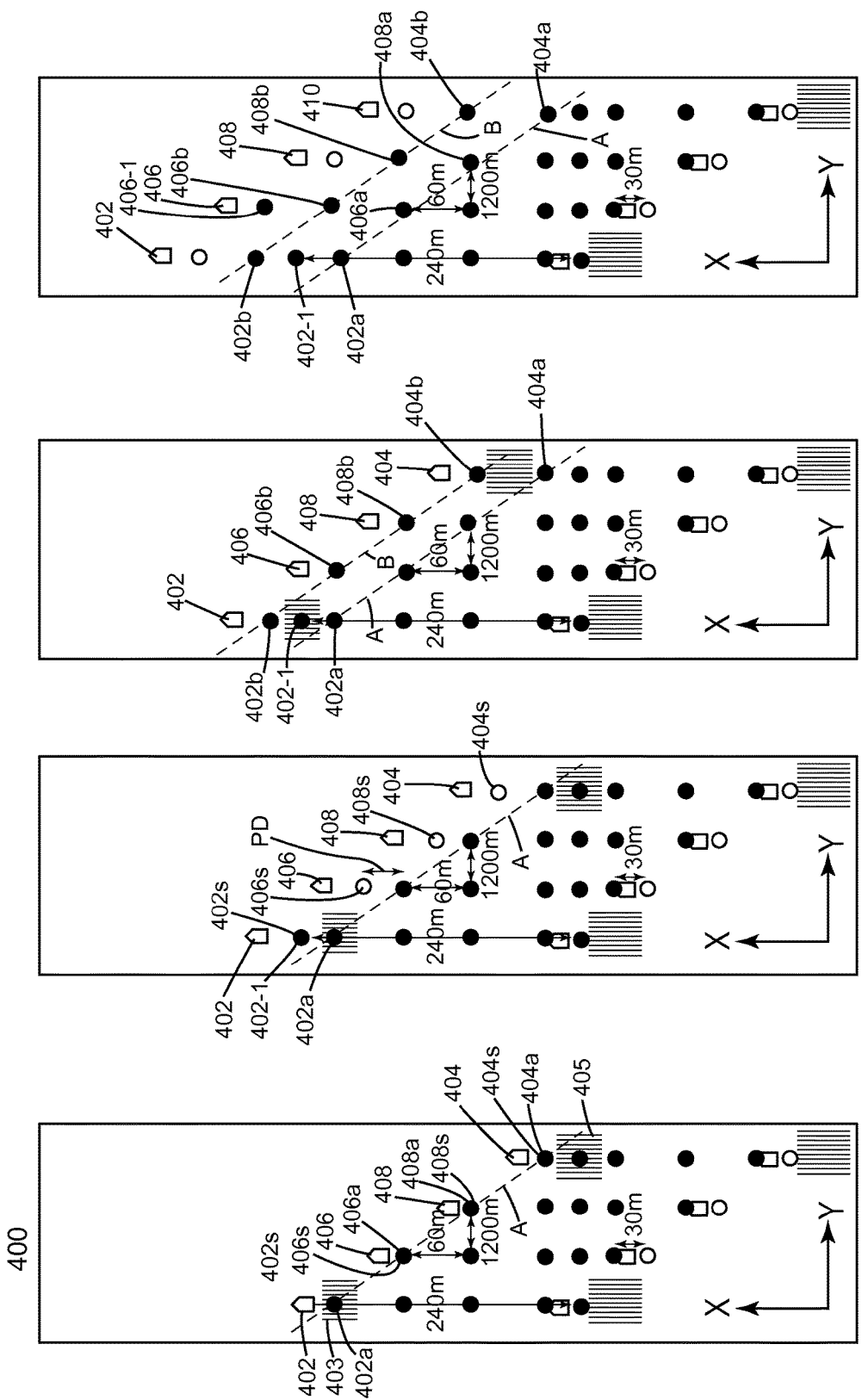

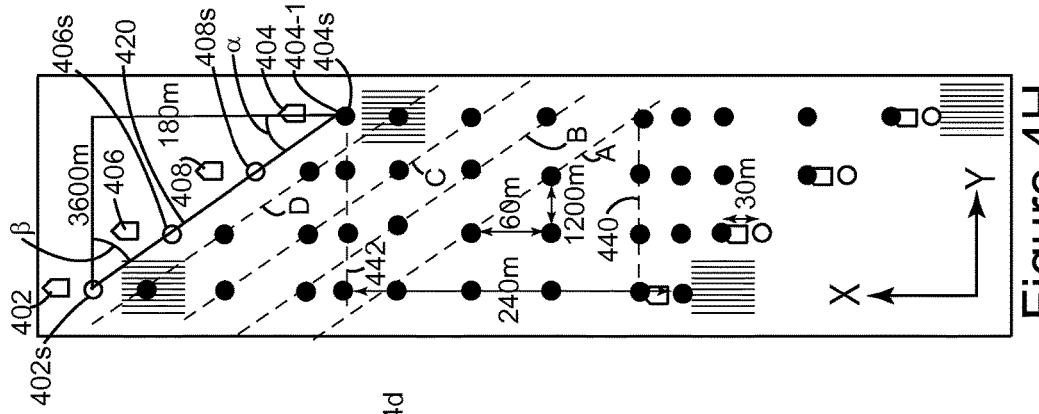
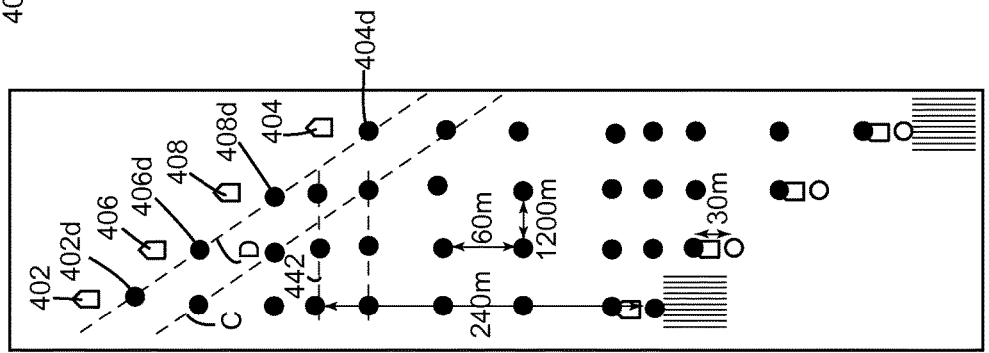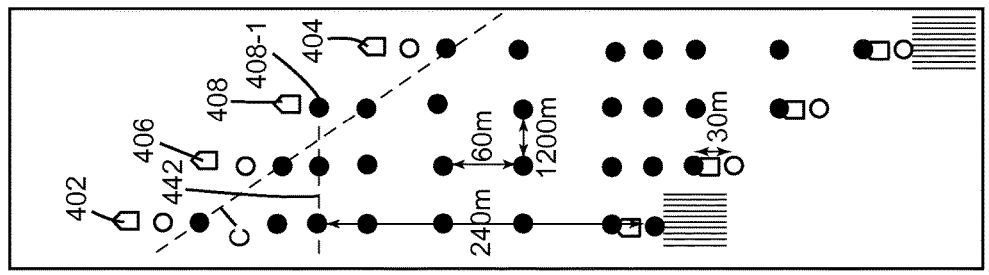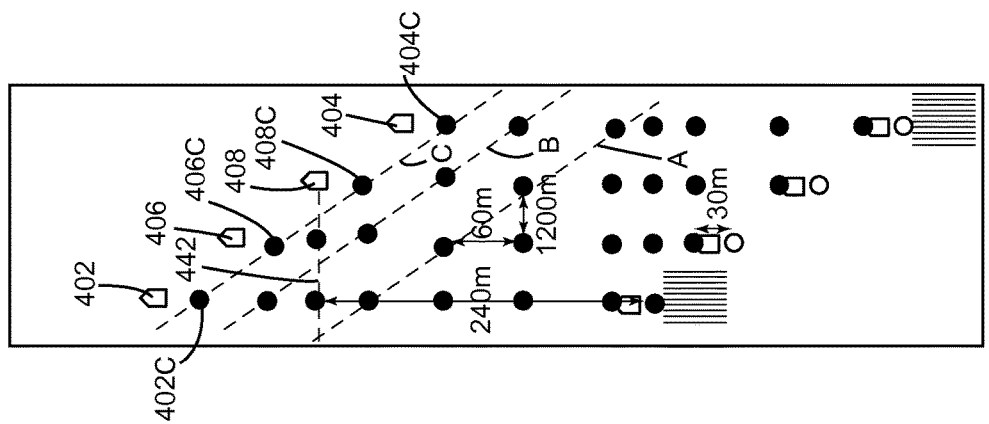

MIXED SEQUENTIAL AND SIMULTANEOUS SOURCE ACQUISITION AND SYSTEM

TECHNICAL FIELD

Embodiments of the subject matter disclosed herein generally relate to methods and systems for marine seismic data acquisition and, more particularly, to mechanisms and techniques for acquiring blended and unblended marine seismic data of a subsurface during a single seismic survey.

BACKGROUND

Marine seismic data acquisition and processing techniques are used to generate a profile (image) of a geophysical structure (subsurface) under the seafloor. This profile does not necessarily provide an accurate location for oil and gas reservoirs, but it may suggest, to those trained in the field, the presence or absence of oil and/or gas reservoirs. Thus, providing better images of the subsurface is an ongoing process.

For a seismic gathering process, as shown in FIG. 1, a data acquisition system 100 includes a vessel 120 towing plural streamers 140 that may extend over kilometers behind the vessel. One or more source arrays 160 may also be towed by the vessel 120 or another vessel for generating seismic waves. Conventionally, the source arrays 160 are placed in front of the streamers 140, considering the traveling direction of the vessel 120. The seismic waves generated by the source arrays propagate downward and penetrate the seafloor, eventually being reflected by a reflecting structure (not shown) back to the surface. The reflected seismic waves propagate upward and are detected by detectors on the streamers 140. This process is generally referred to as "shooting" a particular seafloor area, and the area is referred to as a "cell." However, such a method results in data having poor azimuth distribution and shoot density.

An improvement to this conventional data acquisition method is the use of wide-azimuth (WAZ) acquisition. In a typical WAZ survey, a streamer vessel and multiple sources are used to cover a large sea area, and all sources and streamers are controlled at desired depths throughout the survey. WAZ acquisition provides better illumination of the substructure and, thus, a better final image.

A further improvement is the use of plural streamer vessels and plural source vessels as illustrated in FIG. 2. FIG. 2 illustrates a seismic data acquisition system 200 that includes a first streamer vessel 202, a first source vessel 206 offset on both the inline and cross-line directions from the first streamer vessel 202, a second source vessel 208 offset on both the inline and cross-line directions from the first source vessel 206, and a second streamer vessel 204 offset on both the inline and cross-line directions from the second source vessel 208. In other words, both the streamer vessels and the source vessels are offset on both the inline (travel) direction X and the cross-line direction Y from each other.

The sources attached to the source and streamer vessels are shot in the following sequence: vessel 202 shoots its source when reaching position 202a, vessel 206 shoots its source when reaching position 206a, vessel 208 shoots its source when reaching position 208a and vessel 204 shoots its source when reaching position 204a. Note that positions 202a, 204a, 206a and 208a are aligned along a line 210 that extends along the cross-line direction. An inline distance between two vessels may be 30 m. Thus, under this scenario (sequential shooting), the data recorded by the receivers is unblended, i.e., the data does not mix up shoots from different sources. However, this sequential shooting mode has the disadvantage of the data having poor density, as illustrated by points 220.

To improve the poor density of the system 200, another system 300 was proposed as illustrated in FIG. 3. System 300 may include the same number of streamer vessels and source vessels as system 200, but the shooting (simultaneous shooting) is different. For system 300, all the vessels 302, 304, 306 and 308 shoot simultaneously (or nearly simultaneously) at locations 302a, 304a, 306a and 308a distributed along a line 310. The line 310 is not parallel to the cross-line direction Y as in FIG. 2, but rather makes a non-zero angle with the cross-line direction Y. In this way, the shoots' density is improved, as illustrated by shooting locations 320. However, the recorded data mixes up the shoots, i.e., produces blended data.

Sequential and simultaneous shooting modes have their advantages and limitations. To summarize, the main strength of the sequential shooting mode is taking advantage of existing seismic experience, where the corresponding workflow from acquisition to processing is very well-established. In return, the main weakness of the sequential shooting mode is the low shot density, especially in the case of multi-vessel operations such as WAZ acquisitions.

The main interest in simultaneous shooting mode is the gain on shot density. The fold and signal-to-noise ratio can thus be drastically improved. However the most problematic aspect of this strategy is located at the early state of processing: a tedious de-blending step is always required for velocity model building purposes.

The use of one or the other mode will provide either a simple workflow with low shot density (no simultaneous shooting of the sources) or a complex workflow with high shot density (full simultaneous shooting sources).

Thus, there is a need to find another shooting mode way that combines the advantages of sequential shooting mode with those of simultaneous shooting mode and removes or minimizes their disadvantages. Accordingly, it would be desirable to provide systems and methods that avoid the afore-described problems and drawbacks, and avoid the de-blending step.

SUMMARY

According to an exemplary embodiment, there is method for acquiring blended and unblended seismic data. The method includes deploying a predetermined number (N) of seismic sources that advance along a given path with a constant velocity; shooting only one source of the predetermined number of seismic sources at a first position; advancing the predetermined number of seismic sources by a predetermined distance (PD) along the given path; simultaneously shooting two or more sources of the predetermined number of seismic sources at corresponding second positions; and recording the blended and unblended data which is indicative of seismic reflections or refractions initiated by the step of shooting only one source and by the step of simultaneously shooting two or more sources. The predetermined number of seismic sources are distributed along a traveling curve that is maintained during the seismic survey, and the traveling curve makes a non-zero angle ($\alpha$) with the inline direction (X).

According to another exemplary embodiment, there is a seismic survey acquisition system for acquiring blended and unblended seismic data. The system includes a plurality of streamers towed by a streamer vessel; a first source towed by the streamer vessel; a plurality of source vessels towing second and third sources, wherein the first source, the second source and the third source are distributed along a traveling curve that is maintained while performing a seismic survey; and a computerized system that communicates with the streamer vessel and the plurality of source vessels. The computerized system is configured to shoot only the first source at a first position, advance the first to third sources by a predetermined distance (PD) along a given path, and simultaneously shoot the first to third sources at corresponding second positions.

According to yet another exemplary embodiment, there is a method for simultaneously acquiring blended seismic data and unblended seismic data during a single seismic survey. The method includes advancing first to third sources with a constant speed along a given path; shooting only the first source at a first position; shooting simultaneously the first to third sources at later second positions; shooting only the second source at a third position later than a corresponding second position; shooting simultaneously the first to third sources at later fourth positions; and shooting only the third source at a fifth position later than a corresponding fourth position.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 4A-H are schematic diagrams illustrating a mixed sequential and simultaneous shooting mode according to an exemplary embodiment;

DETAILED DESCRIPTION

Figure 1:
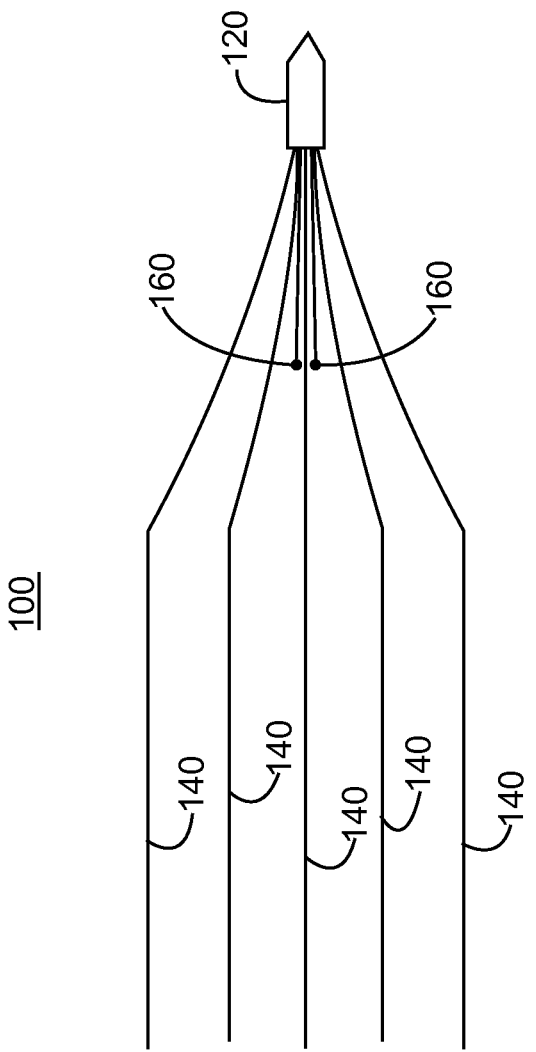
FIG. 1 is a schematic diagram of a conventional seismic data acquisition system.
Figures 2, 3:
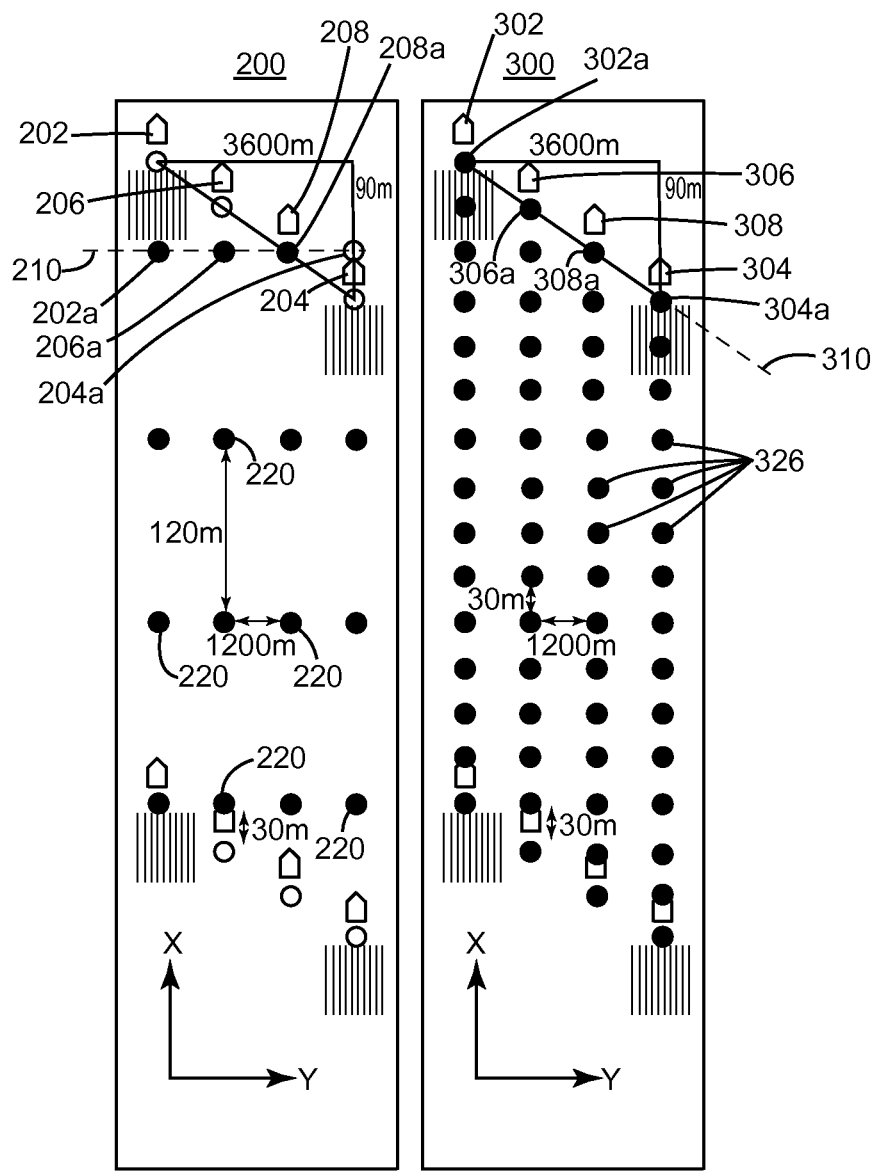
FIG. 2 is a schematic diagram illustrating a sequential shooting mode.
FIG. 3 is a schematic diagram illustrating a simultaneous shooting mode.

The following description of the exemplary embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure of a seismic acquisition system that includes two streamer vessels and two source vessels. However, the embodiments to be discussed next are not limited to this configuration, but may be extended to any number of streamer and/or source vessels. Further, for simplicity, it is considered that the vessels advance on a straight line. However, the novel concepts apply to a situation when the vessels follow a curve path.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

In order to provide a context for the subsequent exemplary embodiments, a description of aspects and terminology is hereby included. It should be noted in an exemplary embodiment that an individual source can be, for example, an air gun. Plural individual sources may be attached to the same float to form a sub-array. One or more sub-arrays (usually three) form a source array. A source array is shown in the previous figures as being towed behind a vessel. In another aspect of an exemplary embodiment, all sources of streamer and source vessels are assumed to be shot during the survey. However, the novel shooting mode to be discussed later is equally applicable when some vessels do not tow a corresponding source, or not all the sources are fired. In another aspect of an exemplary embodiment, a coordinate system for describing the direction of travel of the different vessels can be related to an X-axis and a Y-axis system wherein the X-axis is the direction of travel of the vessels or in-line direction and the Y-axis, also known as the cross-line direction, is perpendicular to the X-axis direction.

According to an exemplary embodiment, a seismic marine survey may be conducted with plural streamer vessels and source vessels. A streamer vessel is understood to be a vessel that tows streamers and at least one source. A source vessel is understood to be a vessel that tows only sources and no streamers. The shooting of the sources is performed in such way that sets of blended and unblended data are acquired simultaneously during the same seismic survey. The two sets of data are independently recorded by the same receivers. The two sets of data characterize the same subsurface and are acquired contemporaneously. The two sets of data may be generated shot by shot, with P shots being added to the blended data and R shots being added to the unblended data sequentially and alternately. In one embodiment, P and R can take any value equal to or larger than 1. The novel shooting sequence is now discussed in detail.

According to an exemplary embodiment, there are systems and methods for acquiring blended and unblended seismic data during a single seismic survey. The blended and unblended seismic data is generated with a plurality of sources that are fired in a dedicated sequence. The sequence involves firing all the sources at a first time, advancing the sources along an inline direction, firing only a first source at a second time, later than the first time, advancing again the sources, firing again all the sources at a third time, later than the second time, advancing the sources, firing only a second source at a fourth time, later than the third time, and so on until a desired subsurface is fully surveyed. The firing frequency of the sources may be varied as discussed later.

According to an exemplary embodiment illustrated in FIG. 4A, two streamer vessels 402 and 404 and two source vessels 406 and 408 are deployed to simultaneously acquire blended and unblended data, which characterize the same subsurface, and the two sets of data are collected during the same seismic survey. In one application, although the two sets of data describe the same subsurface, the physical location of the shoots is different. For clarity, the concept is illustrated in FIGS. 4A-H in a particular marine, multi-vessel, mono-source towed streamer context (such as a WAZ case). This means that this exemplary embodiment shows each vessel towing a corresponding source and a first vessel 402 and last vessel 404 on a cross-line direction also carrying corresponding streamers 403 and 405, respectively. Note that it is possible to have vessels towing only streamers and no sources. However, the novel concept remains applicable whatever the context (land sources or marine sources), the vessel trajectories and the relative positions of the sources, the receiver technology (hydrophone and/or geophone and/or accelerometers distributed on streamers, ocean bottom nodes, land nodes, etc.), the number and spacing (fan) of the streamers or sources, the source number (flip-flop) and sampling, or the type of source (e.g., air gun, vibratory source, etc.).

Figure 7:
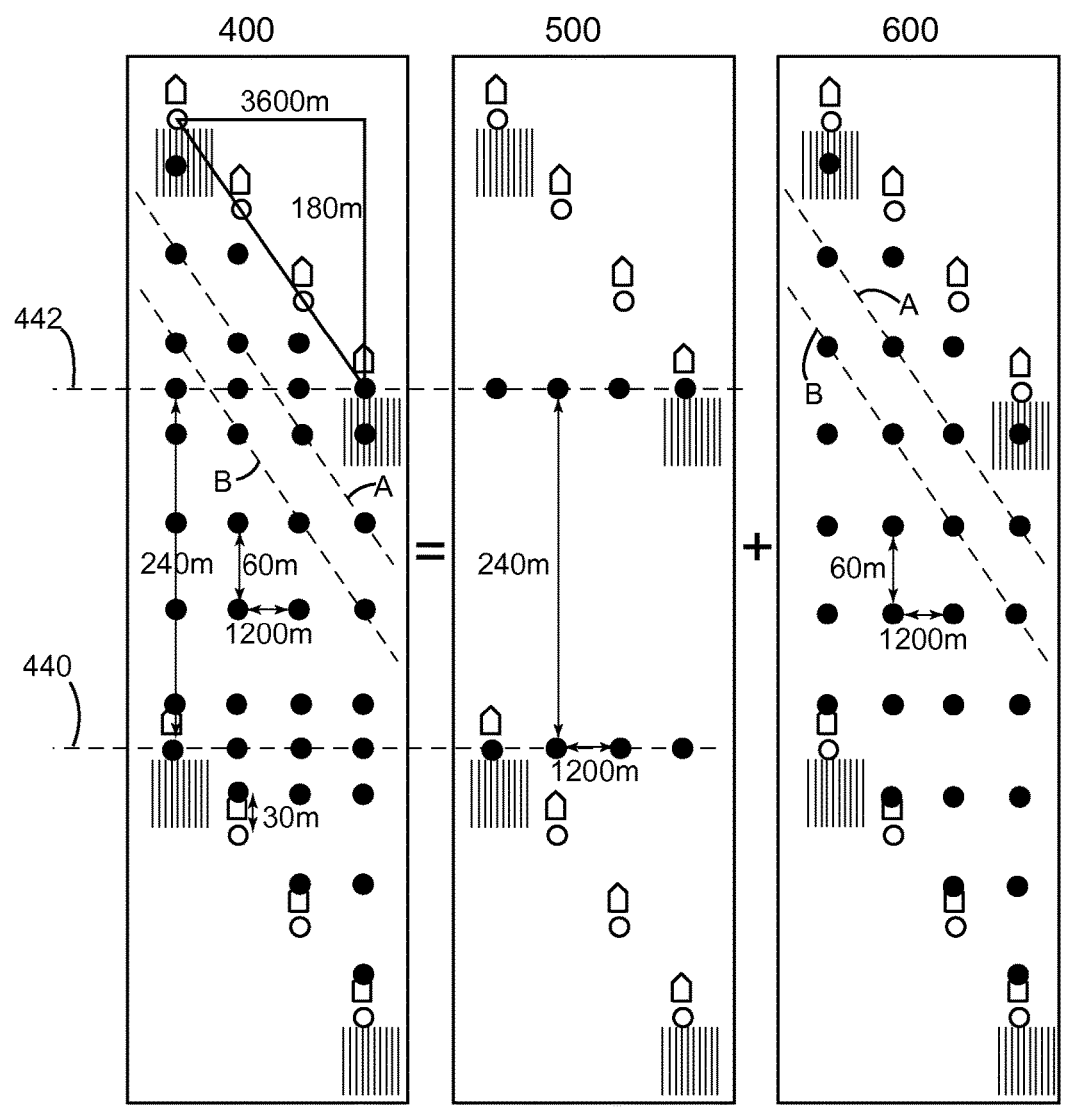
FIG. 7 is a drawing illustrating a shot point density for a mixed sequential and simultaneous shooting mode according to an exemplary embodiment.

The outcome of the novel mixed sequential and simultaneous shooting mode is shown in FIG. 4H. The data shown in FIG. 4H includes the set of unblended data (corresponding to lines 440 and 442) and the set of blended data (corresponding to lines A, B, C and D). The shoot density is much higher compared to the pure sequential shooting mode illustrated in FIG. 5 for a system 500 (that includes only unblended data corresponding to shoots located on lines 440 and 442) and is comparable with the pure simultaneous shooting mode illustrated in FIG. 6 for a system 600 (that includes only blended data corresponding to shoots located on lines A, B, C and D). In other words, as illustrated in FIG. 7, the novel acquisition system 400 includes the unblended data that would be obtained by system 500 (lines 440 and 442) and the blended data that would be obtained by system 600 (only lines A and B are shown for simplicity).

An explanation of how system 400 achieves both the blended and unblended data sets during the same seismic survey is now discussed with regard to FIGS. 4A-H. FIG. 4A shows system 400 including streamer vessels 402 and 404 and source vessels 406 and 408, each having corresponding sources 402S, 404S, 406S and 408S. Thus, each vessel may tow its own source. In one application, not all the vessels tow a source. The sources 402S, 404S, 406S and 408S are shown (see for example FIG. 4H) being located along a traveling curve 420, a straight line in this case, that makes an angle α with the inline direction X and an angle β with the cross-line direction Y. These two angles are complementary, i.e., the sum of the two angles is substantially 90° when the curve 420 is a straight line. It is noted that the traveling curve 420 is maintained while the vessels advances during the seismic survey. Exemplary distances between the vessels are provided in FIG. 4H. However, other distances may be used. Note that the traveling curve 420 may be a parameterized curve (e.g., a parabola, hyperbola, circle, oval, etc.), may be made of plural straight lines connected to each other, etc. If traveling curve is not a straight line, it is located asymmetrically relative to the inline direction.

Considering that during acquisition, the group of four vessels is progressing along a straight vertical line from the bottom to top of the figures (i.e., along the inline direction X, however, as noted above, these novel ideas also apply when the vessels advances on a curved path), FIG. 4A shows all the vessels simultaneously shooting their sources at positions 402a, 404a, 406a, and 408a. The term "simultaneous" is understood in this patent application as meaning that two or more sources shoot either exactly at the same time $t_0$, or during a time interval $t_0+/-\Delta t$, where $\Delta t$ is in the range of 5 s. These source shooting positions, which lie on line A, mirror the shape of the traveling curve 420. After all the vessels advance along the inline direction for a predetermined distance PD (e.g., PD=30 m), as shown in FIG. 4B, only vessel 402 shoots its source 402S at position 402-1. This means that the other vessels do not shoot their sources at this position. The data recorded for this position will be part of the unblended data because the other sources are not shot, as indicated by an empty circle next to vessels 404, 406 and 408.

After the vessels advance again by the predetermined distance PD as shown in FIG. 4C, all the sources 402S, 404S, 406S and 408S are shot at positions 402b, 404b, 406b and 408b. These shoots generate part of the blended data and they are aligned along line B. Further, the vessels advance by the predetermined distance PD and, as shown in FIG. 4D, only vessel 406 shoots its source 406S at position 406-1. By continuing this alternate shooting of a single vessel and all vessels separated by the predetermined distance, the shooting positions on lines A, B, C and D are achieved for the blended data, and the shooting positions on lines 440 and 442 are achieved for the unblended data as shown in FIG. 4H.

Figures 5, 6:
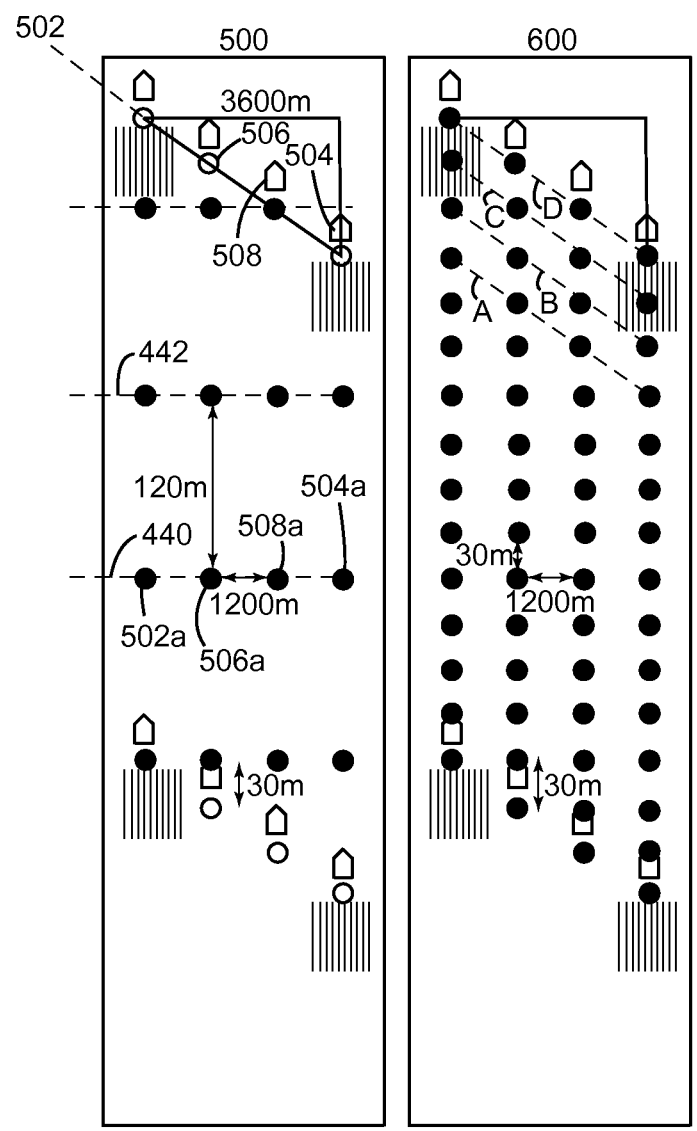
FIG. 5 is a drawing illustrating a shot point density for a sequential shooting mode.
FIG. 6 is a drawing illustrating a shot point density for a simultaneous shooting mode.

This seismic data acquisition is different from traditional ways, as now discussed with regard to FIGS. 5 and 6. FIG. 5 illustrates sequential shooting mode, in which the first vessel 502 is shooting first and alone (no simultaneous sources case). Its corresponding source-shooting position is a full dot 502a. After this step, the group is advancing by the predetermined distance, and then only the second vessel 506 is shooting. The corresponding source-shooting position of this second shot is symbolized with another full dot 506a. After this third step, the group is advancing again by the predetermined distance upward, and then only the third vessel 508 is shooting at position 508a. At the fourth step, only the fourth vessel 504 shoots at position 504a. At this time, the line 440 of shooting positions have been achieved. The survey then continues in the same manner to form line 442 and so on.

For the simultaneous shooting mode illustrated in FIG. 6, the movement of the group of vessels remains the same as for the mode illustrated in FIG. 5. The difference from the sequential shooting mode illustrated in FIG. 5 is that all sources are now shooting simultaneously at each step. The resulting shot positions are indicated with a full dot, and these positions form lines A, B, C and D. Note that at the end of the simultaneous shooting mode of FIG. 6, shot density is considerably increased compared to the sequential shooting mode of FIG. 5 (by a factor of 4 in this case). However, all the recorded data for the simultaneous shooting mode is now blended.

Comparing results of sequential shooting mode and simultaneous shooting mode with those of the novel mode illustrated in FIGS. 4A-H, note that at the end of the novel acquisition scenario, shot density is increased compared to sequential shooting mode by a factor of 2.5 (=0.5×(number of vessels+1) in case of a 4-vessel configuration, and only half of the records are blended, while the other half is unblended. Of course, the above numbers depend on how many vessels are used during the survey.

FIG. 7 visually illustrates why the novel flexible simultaneous shooting mode is equivalent to two simultaneous acquisitions: one sparse corresponding to the sequential shooting mode (of system 500) and one corresponding to the simultaneous shooting mode (of system 600). This is why, by construction, the data resulting from a the novel flexible shooting acquisition mode can be separated into two parts: one blended and one unblended.

Figures 8, 9, 10:
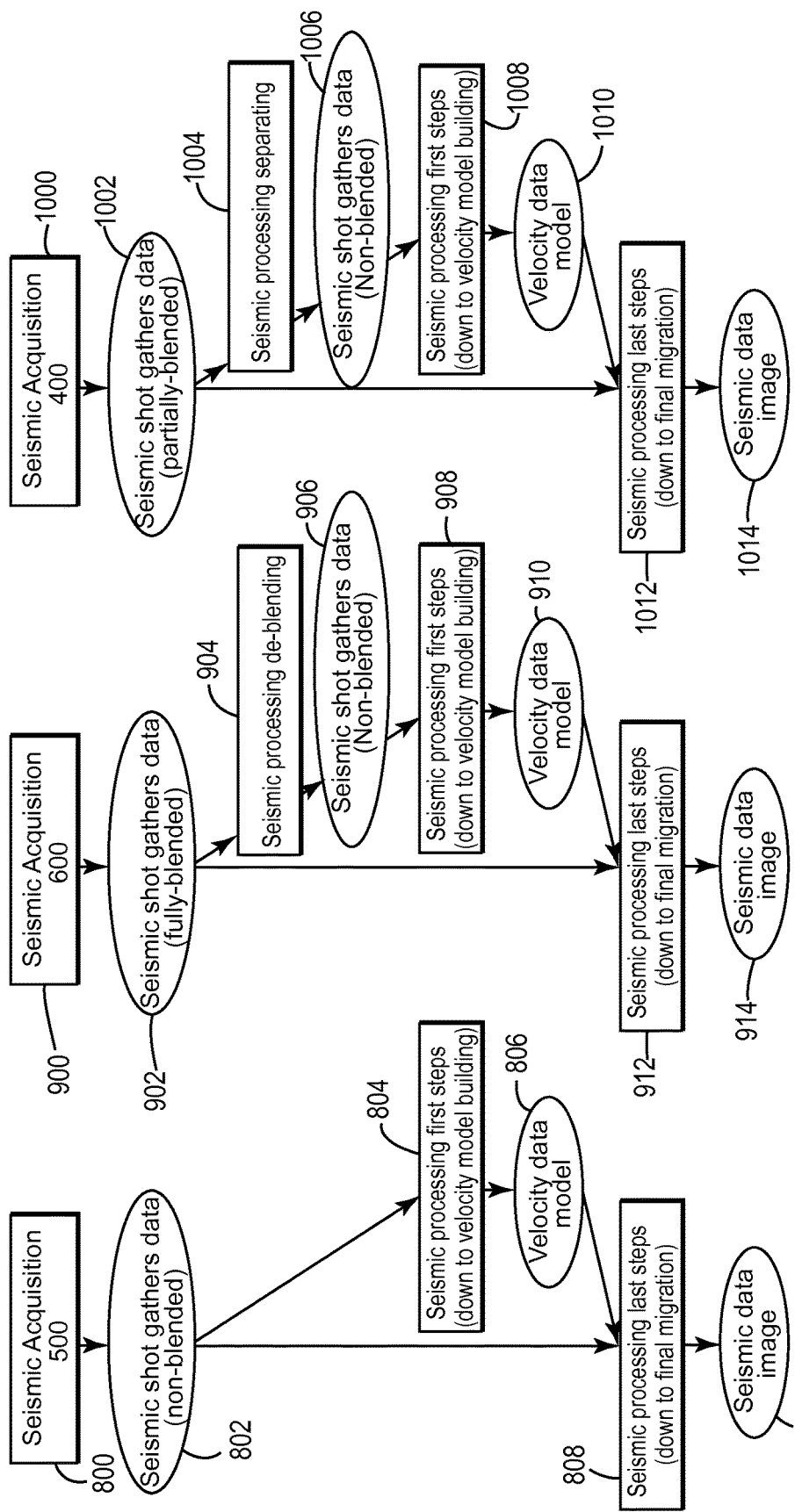
FIG. 8 is a flowchart for processing unblended seismic data.
FIG. 9 is a flowchart for processing blended seismic data.
FIG. 10 is a flowchart for processing unblended and blended seismic data according to an exemplary embodiment.

One advantage of having both blended and unblended data acquired for the same subsurface during the same seismic survey is now explained with regard to FIGS. 8-10. FIG. 8 schematically illustrates generic steps for obtaining an image of the surveyed subsurface. The process starts with step 800 in which unblended data is acquired by system 500 as illustrated in FIG. 5. The data (unblended) is obtained in step 802. In step 804, various initial processing steps are performed. In step 806, the velocity model is constructed. The velocity model is necessary for generating an accurate image of the surveyed subsurface. In step 808 other processing steps are performed, for example, normal move out, migration, etc. Finally, in step 810 the final image of the surveyed surface is formed.

FIG. 9 illustrates a similar process, but this time fully blended data is used instead of unblended data. The process starts with step 900 in which the seismic acquisition is performed with system 600 as illustrated in FIG. 6. In step 902, the fully blended data is obtained. In order to construct the velocity model, the data needs to be de-blended (to obtain unblended data) because blended data cannot be currently used to construct the velocity model. Note that the term "unblended data" is used in this application to mean data that was recorded to not be blended with other data, while the term "de-blended data" implies that blended data was processed to separate it. In other words, the unblended data is recorded in this way while the de-blended data is processed to not be blended. This step 904 is computer-intensive and time-consuming. With the de-blended data obtained in step 906, traditional initial processing steps are performed in step 908, and the velocity model is constructed in step 910. Based on the velocity model and the recorded blended data, further conventional processing steps are performed in step 912, and the final image of the surveyed subsurface is generated in step 914. Note that the process illustrated in FIG. 9 is slow because of the de-blending step 904.

Because conventional velocity model building methods do not tolerate blended data, a tedious de-blending step 904 is always required at the pre-processing level in simultaneous shooting mode. In contrast, modern versions of the algorithms used at the last processing stage can accommodate blended data. Thus, by using system 400 and the novel mixed shooting mode, acquired data can be naturally separated into two parts: one fully blended and the other completely unblended. The unblended data can be separated from the blended data through data sorting and directly used for velocity model building purposes, eliminating the tedious step of de-blending. The blended data may be used directly in the last processing steps without performing a de-blending step.

In other words, as illustrated in FIG. 10, after the data is acquired using system 400 in step 1000, the recorded data (including a blended part and unblended part) is provided in step 1002. In step 1004, the data is separated into the two parts, which is a step less tedious than de-blending step 904.

After obtaining the unblended part in step 1006, early processing is performed in step 1008 and the velocity model is built in step 1010 based on the unblended part of the data. In step 1012, using the velocity model from step 1010 together with the blended data from step 1002 or step 1004, various late processing processes may be performed, and in step 1014 the final image of the subsurface is determined.

It can be seen that the novel mixed sequential and simultaneous shooting mode generates an alternative to the two extreme cases (sequence shooting mode and simultaneous shooting mode) and the mixed mode merges the advantages of both modes, i.e., high shot density (blended data) and simple workflow (tedious de-blending replaced by simple trace sorting).

The novel concept was illustrated in the above embodiments for a special case in which blended shots equally alternate with unblended shots. This scenario may be called the "50%-50%" case. However, other scenarios are possible. For instance, it is possible to have two consecutive unblended shots followed by one blended shot. This scenario may be called the 66%-33% case. Further, the 80%-20% case has four consecutive unblended shots followed by one blended shot. Other shot patterns may be imagined. This property makes the novel shooting mode very flexible. The optimum ratio (% blended data-% unblended data) is case-dependent. For example, if the fold needs to be increased, then increase the shot density by increasing the blended data percentage. If artifacts in model building need reduction, then increase the unblended data percentage.

Thus, according to an embodiment, there is a method for processing mixed sequential and simultaneous seismic data. The method includes a step of acquiring the mixed sequential and simultaneous seismic data by shooting seismic sources one by one during a first part of the seismic survey and by shooting the seismic sources simultaneously during a second part of the seismic survey, a step of separating unblended data corresponding to the first part from blended data corresponding to the second part, a step of using the unblended data to generate a velocity model, and a step of using the blended data and the velocity model to generate an image of a surveyed subsurface.

The step of separating includes data sorting and not de-blending the data. Still with regard to this method, the first part is interleaved with the second part, the seismic sources are shot sequentially, one by one, during a first sequence and then shot simultaneously, during a second sequence. In one application, the first sequence is followed by the second sequence. In another application, the first sequence is repeated for p times followed by the second sequence, where p is a number between 1 and 10. In another application, the second sequence is repeated r times followed by the first sequence, where r is a number between 1 and 10. In still another application, the first part includes only first sequences and the second part includes only second sequences.

Figure 11:
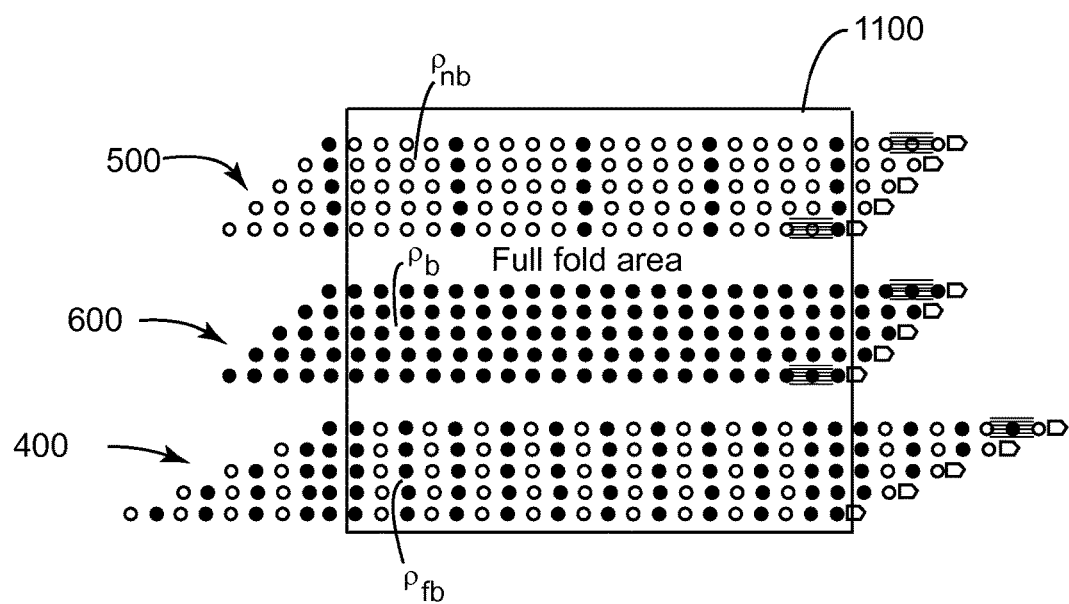
FIG. 11 is a schematic diagram illustrating the shot point densities for sequential, simultaneous and mixed sequential and simultaneous shooting modes according to an exemplary embodiment.

FIG. 11 illustrates how the shot point density of the novel mixed shooting mode may be correlated with the shot point density of the sequential shooting mode and the shot point density of the simultaneous shooting mode. Consider $\rho_{nb}$ being the shot point density for the unblended acquisition (dark dots in top part of FIG. 11), $\rho_b$ being the shot point density for blended acquisition (dark dots in the middle part of FIG. 11), and $\rho_{fb}$ being the shot point density for the novel mixed acquisition (dark dots in the bottom part of FIG. 11).

Considering an area 1100 for the three different modes, it can be shown that the relation among the shot point densities introduced above is given by:

$$\rho_{fb} = 0.5 \times (N_{vessel}+1) \times \rho_{nb},$$

where $N_{vessel}$ is the total number of vessels participating in the survey and $\rho_b = N_{vessel} \times \rho_{nb}$ (it is noted that this formula is correct when all the sources are simultaneously fired). Thus, a shot point density for flexible shooting mode may be chosen as desired as a function of the shot point densities for sequential and simultaneous shooting modes.

Figure 12:
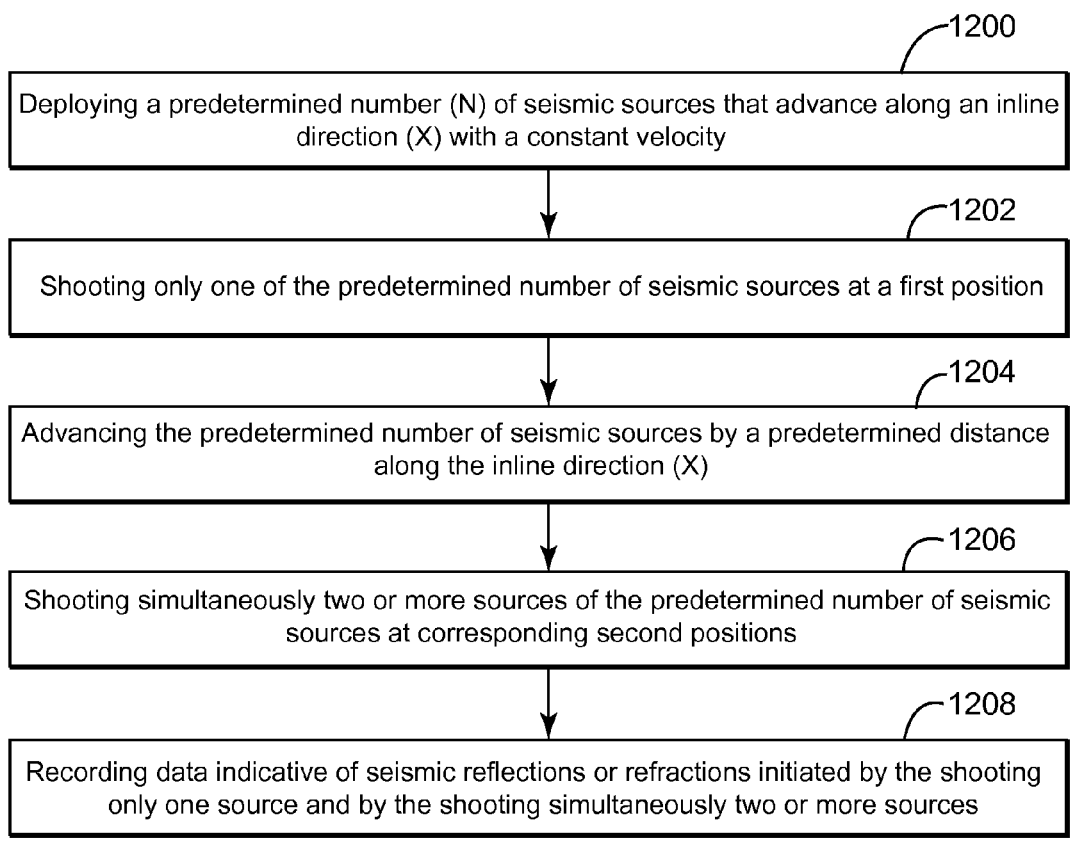
FIG. 12 is a flowchart of a method for collecting blended and unblended data during a single seismic survey according to an exemplary embodiment.

The novel mixed shooting mode may be implemented as a method as discussed next with regard to FIG. 12. FIG. 12 is a flowchart illustrating a method for acquiring seismic data. The method includes a step 1200 of deploying a predetermined number (N) of seismic sources that advance along an inline direction (X) with a constant velocity; a step 1202 of shooting only one source 402 of the predetermined number of seismic sources at a first position 402-1; a step 1204 of advancing the predetermined number of seismic sources by a predetermined distance (PD) along the inline direction (X); a step of shooting simultaneously two or more sources 406 and 408 of the predetermined number of seismic sources at corresponding second positions 406a and 408a; and a step of recording data indicative of seismic reflections or refractions initiated by the step of shooting only one source and by the step of simultaneously shooting two or more sources.

Figure 13:
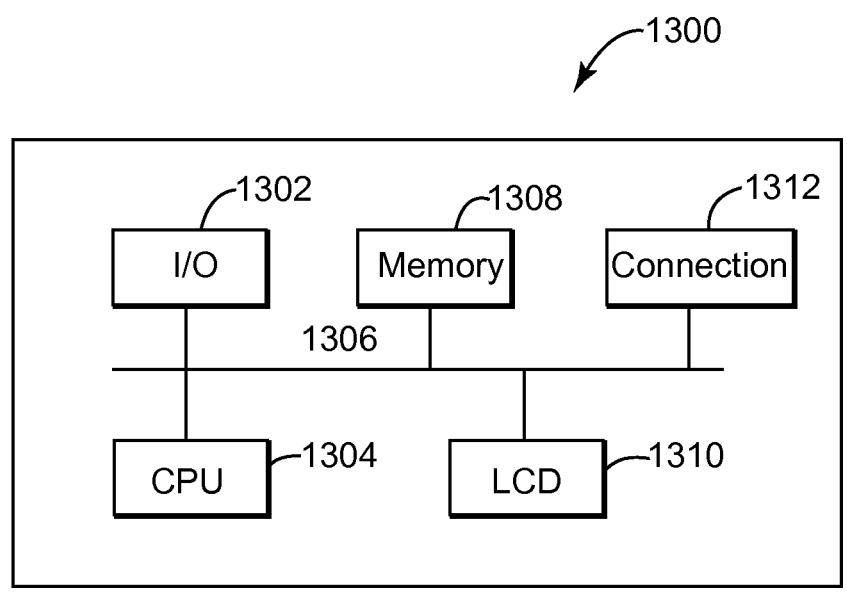
FIG. 13 is a schematic diagram of a computerized system that implements various methods according to an exemplary embodiment.

One or more of the methods discussed above may be implemented in a computerized navigation system which can be, for example, generally represented by the structure shown in FIG. 13. The computerized navigation system 1300 may be located on each vessel or distributed over all the vessels. The navigation system may uniquely identify each source and receiver defined in the project (mapping). The navigation system from each vessel may share information/data with the navigation systems from the other vessels. This is generally achieved through the use of redundant radio links.

Thus, a computerized navigation system 1300 may receive, via the input/output interface 1302, information pertinent to positions of the sources and/or streamers, the mixed shooting mode, etc., and may use this information to implement any of the configurations and/or seismic data acquisition methods described above. In addition, the computerized system 1300 may include a processor 1304 for processing the above-noted data. The interface 1302 and the processor 1304 are connected to a bus 1306. Further, the computerized system 1300 may include a memory 1308 to store the above-noted data, a display 1310, a connection 1312 to the streamers and/or the sources, and other elements common for a computerized system or server as would be recognized by those skilled in the art. It will be appreciated by those skilled in the art that FIG. 13 represents a generalization of an onboard navigation system used in conjunction with the various embodiments described herein and that such a navigation system may omit elements illustrated in the figure and/or include other elements.

The above-disclosed exemplary embodiments provide a system and a method for acquiring seismic data having a blended part and an unblended part. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. Further, it is noted that the above embodiments may be implemented in software, hardware or a combination thereof.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for acquiring blended and unblended seismic data during a seismic survey, the method comprising:

deploying a predetermined number (N) of seismic sources that advance along a given path with a constant velocity;

shooting only one source of the predetermined number of seismic sources at a first position to generate unblended seismic data;

advancing the predetermined number of seismic sources by a predetermined distance (PD) along the given path;

simultaneously shooting two or more sources of the predetermined number of seismic sources at corresponding second positions to generate blended seismic data; and recording the blended and unblended data which is indicative of seismic reflections or refractions initiated by the step of shooting only one source and by the step of simultaneously shooting two or more sources, wherein the predetermined number of seismic sources are distributed along a traveling curve that is maintained during the seismic survey, and the traveling curve is a straight line that makes a non-zero angle with the given path, wherein the unblended seismic data and the blended seismic data are alternately generated as the predetermined number of seismic sources advances along the given path during the seismic survey, and wherein each seismic source of the predetermined number (N) of seismic sources is towed by a corresponding vessel, there are two vessels each towing corresponding plural streamers and a corresponding seismic source of the predetermined number (N) of seismic sources, and there are two other vessels towing only the corresponding seismic sources of the predetermined number (N) of seismic sources.

2. The method of claim 1, wherein each seismic source is a marine seismic source and the given path coincides with the inline direction (X).

3. The method of claim 2, wherein the two vessels that tow corresponding plural streamers include a first vessel and a last vessel along the traveling curve.

4. The method of claim 1, wherein the predetermined distance PD is selected such that a seismic wave generated at the first position has time to propagate to a subsurface that is being surveyed, reflect from a reflector, and arrive at a receiver for being recorded prior to a next shooting of a next source.

5. The method of claim 1, further comprising:

shooting simultaneously all the predetermined number of seismic sources at corresponding second positions.

6. The method of claim 1, further comprising:
separating a blended part from an unblended part in the blended and unblended data.

7. The method of claim 1, wherein the traveling curve is a parameterized curve.

8. The method of claim 1, wherein there are four seismic sources distributed along the traveling curve.

9. The method of claim 1, wherein the second positions are distributed along a first curve (A) that is substantially parallel with the traveling curve.

10. The method of claim 1, further comprising:
further advancing the predetermined number of seismic sources by the predetermined distance (PD) along the given path; and
shooting only a second source at a third position such that the first position and the third position form a straight line that is substantially perpendicular on the given path.

11. The method of claim 10, further comprising:
advancing the predetermined number of seismic sources by the predetermined distance (PD) along the given path; and
shooting simultaneously the two or more sources of the predetermined number of seismic sources at corresponding fourth positions.

12. The method of claim 11, wherein the fourth positions are distributed along a second line (B) that is substantially parallel with the traveling curve.

13. The method of claim 11, wherein the step of shooting simultaneously two or more sources and the step of shooting only a source are repeated until each source is shot alone to generate an unblended part of the blended and unblended data.

14. The method of claim 1, further comprising:
shooting only a second source after the step of shooting only a first source and before the step of shooting simultaneously two or more sources.

15. A seismic survey acquisition system for acquiring blended and unblended seismic data during a seismic survey, the system comprising:
a plurality of streamers towed by a streamer vessel;
a first source towed by the streamer vessel;
a plurality of source vessels towing second and third sources, wherein the first source, the second source and the third source are distributed along a traveling curve that is maintained while performing the seismic survey, and the traveling curve is a straight line that makes a non-zero angle with the given path;
a computerized system that communicates with the streamer vessel and the plurality of source vessels and configured to control,
shooting only the first source at a first position to generate unblended seismic data,
advancing the first to third sources by a predetermined distance (PD) along a given path; and
simultaneously shooting the first to third sources at corresponding second positions to generate blended seismic data, wherein the second positions are distributed along a first curve (A) that is substantially parallel with the traveling curve, and
plural receivers attached to the plurality of streamers and configured to record the blended and unblended data which is indicative of seismic reflections or refractions initiated by shooting only the first source and by simultaneously shooting the first to third sources,
wherein the unblended seismic data and the blended seismic data are alternately generated as the first to third seismic sources advance along the given path during the seismic survey.

16. The system of claim 15, wherein the traveling curve is a parameterized curve.

17. The system of claim 15, wherein the computerized system is further configured to:
further advance the first to third sources by the predetermined distance (PD) along the given path;
shoot only the second source at a third position such that the first position and the third position form a straight line;
advance the first to third sources by the predetermined distance (PD) along the given path; and
shoot simultaneously the first to third sources at corresponding fourth positions.

* * * * *